United States Patent

Kloper et al.

(10) Patent No.: US 10,277,384 B2
(45) Date of Patent: Apr. 30, 2019

(54) INTERMEDIATE DISTRIBUTION FRAME FOR DISTRIBUTED RADIO HEADS

(71) Applicant: Cisco Technology, Inc., San Jose, CA (US)

(72) Inventors: David S. Kloper, Santa Clara, CA (US); Brian D. Hart, Sunnyvale, CA (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 15/479,077

(22) Filed: Apr. 4, 2017

(65) Prior Publication Data

US 2018/0287772 A1    Oct. 4, 2018

(51) Int. Cl.
*H04L 7/00*     (2006.01)
*H04L 12/10*    (2006.01)

(52) U.S. Cl.
CPC ............ *H04L 7/0012* (2013.01); *H04L 12/10* (2013.01)

(58) Field of Classification Search
CPC .............................. H04L 7/0012; H04L 12/10
USPC ........................ 370/503–510, 518, 534–541
See application file for complete search history.

(56) References Cited

U.S. PATENT DOCUMENTS

| | | | | |
|---|---|---|---|---|
| 4,143,246 A | * | 3/1979 | Smith ................ | H04Q 11/0407 370/359 |
| RE34,896 E | * | 4/1995 | Calvignac ........... | G06F 13/4022 370/359 |
| 6,128,312 A | * | 10/2000 | Kurosawa ............. | H04J 3/0685 370/465 |
| 6,167,061 A | * | 12/2000 | Nakatsugawa ....... | H04J 3/0638 370/480 |
| 6,493,362 B1 | * | 12/2002 | Inazumi ............... | G11B 27/031 370/503 |
| 6,507,592 B1 | * | 1/2003 | Hurvig ................ | H04L 12/2801 370/503 |
| 6,731,658 B1 | * | 5/2004 | Inazumi ................ | H04H 20/28 348/E5.005 |
| 6,747,997 B1 | * | 6/2004 | Susnow ................ | H04L 7/0083 370/503 |
| 6,859,454 B1 | * | 2/2005 | Bowes .................. | H04L 69/161 341/101 |
| 6,937,618 B1 | * | 8/2005 | Noda ............... | H04N 21/43632 348/432.1 |

(Continued)

FOREIGN PATENT DOCUMENTS

| | | |
|---|---|---|
| EP | 1709768 B1 | 11/2015 |
| WO | 2002047429 A1 | 6/2002 |
| WO | 2006015350 A2 | 2/2006 |

*Primary Examiner* — Thai D Hoang

(74) *Attorney, Agent, or Firm* — Patterson + Sheridan, LLP

(57) ABSTRACT

Embodiments herein describe using an intermediate distribution frame (IDF) which is connected between a central controller and a plurality radio heads which each include at least one antenna for wireless communication with a user device. Instead of running separate cables to each of the radio heads, a single cable can be used to connect the IDF to the central controller and then separate cables can be used to connect the IDF to the radio heads. If the IDF is disposed near the radio heads, the amount of cables can be reduced. Moreover, the IDF may recover a clock signal used by the central controller and forward that clock to the plurality of radio head in order to synchronize the radio heads to the central controller.

20 Claims, 7 Drawing Sheets

(56) References Cited

U.S. PATENT DOCUMENTS

| | | | |
|---|---|---|---|
| 6,950,412 B2* | 9/2005 | Lee | H04W 88/12 |
| | | | 370/310.2 |
| 6,986,073 B2* | 1/2006 | Liu | G06F 9/3867 |
| | | | 370/538 |
| 7,013,413 B1* | 3/2006 | Kim | G11C 7/1051 |
| | | | 714/48 |
| 9,306,798 B2 | 4/2016 | Kullos | |
| 2003/0091070 A1* | 5/2003 | Pail | H04Q 3/0025 |
| | | | 370/532 |
| 2006/0153070 A1 | 7/2006 | DelRegno et al. | |
| 2008/0072113 A1* | 3/2008 | Tsang | H04L 1/1874 |
| | | | 714/748 |
| 2010/0110916 A1* | 5/2010 | Pratt, Jr. | H04L 43/50 |
| | | | 370/252 |
| 2012/0243559 A1* | 9/2012 | Pan | H04J 3/1605 |
| | | | 370/503 |
| 2012/0314721 A1* | 12/2012 | Bulzacchelli | H04L 7/10 |
| | | | 370/503 |
| 2014/0097886 A1* | 4/2014 | Shepard | H02M 1/08 |
| | | | 327/524 |
| 2014/0140439 A1* | 5/2014 | Agrawal | H04L 25/14 |
| | | | 375/316 |

* cited by examiner

FIG. 5

| MLG MAPPING 500 | TOTAL DATA RATE: 100Gbps |
|---|---|
| LINK 1 (10Gbps) | DATA PLANE FOR RH 105A |
| LINK 2 (10Gbps) | DATA PLANE FOR RH 105B |
| LINK 3 (10Gbps) | DATA PLANE FOR RH 105C |
| LINK 4 (10Gbps) | DATA PLANE FOR RH 105D |
| LINK 5 (10Gbps) | DATA PLANE FOR RH 105E |
| LINK 6 (10Gbps) | DATA PLANE FOR RH 105F |
| LINK 7 (10Gbps) | FILL DATA |
| LINK 8 (10Gbps) | FILL DATA |
| LINK 9 (10Gbps) | FILL DATA |
| LINK 10 (10Gbps) | CONVERTED 1 Gbps CONTROL PLANE FOR IDF |

MLG MAPPING 600

| TOTAL DATA RATE: 100Gbps (75Gbps IS USABLE) | |
|---|---|
| LINK 1 (5Gbps) | DATA PLANE FOR RH 105A |
| LINK 2 (5Gbps) | DATA PLANE FOR RH 105B |
| LINK 3 (10Gbps) | DATA PLANE FOR RH 105C |
| LINK 4 (10Gbps) | DATA PLANE FOR RH 105D |
| LINK 5 (10Gbps) | DATA PLANE FOR RH 105E |
| LINK 6 (10Gbps) | DATA PLANE FOR RH 105F |
| LINK 7 (10Gbps) | DATA PLANE FOR RH 105G |
| LINK 8 (10Gbps) | DATA PLANE FOR RH 105H |
| LINK 9 (0Gbps) | UNUSED |
| LINK 10 (5Gbps) | CONVERTED 1 Gbps CONTROL PLANE FOR IDF |

FIG. 6

INTERMEDIATE DISTRIBUTION FRAME FOR DISTRIBUTED RADIO HEADS

TECHNICAL FIELD

Embodiments presented in this disclosure generally relate to using an intermediate distribution frame (IDF) for a distributed system with multiple radio heads.

BACKGROUND

Typically, an IDF is a distribution frame in a building, stadium, or campus which cross-connects the user cable media to individual user line circuits. The IDF can serve as a distribution point for multi-pair cables from the main distribution frame (MDF) or combined distribution frame (CDF) to individual cables connected to equipment in areas remote from the MDF and CDF. IDFs can be used for telephone exchange central office, customer-premises equipment, wide area network (WAN), and local area network (LAN) environments, etc. In WAN and LAN environments, IDFs can hold devices of different types including backup systems, (hard drives or other media as self-contained, or as RAIDs, CD-ROMs, etc.), networking (switches, hubs, routers), and connections (optical, coaxial, category cables) and so on.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a multi-link gearbox mapping, according to one embodiment.

FIG. 6 is a multi-link gearbox mapping, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
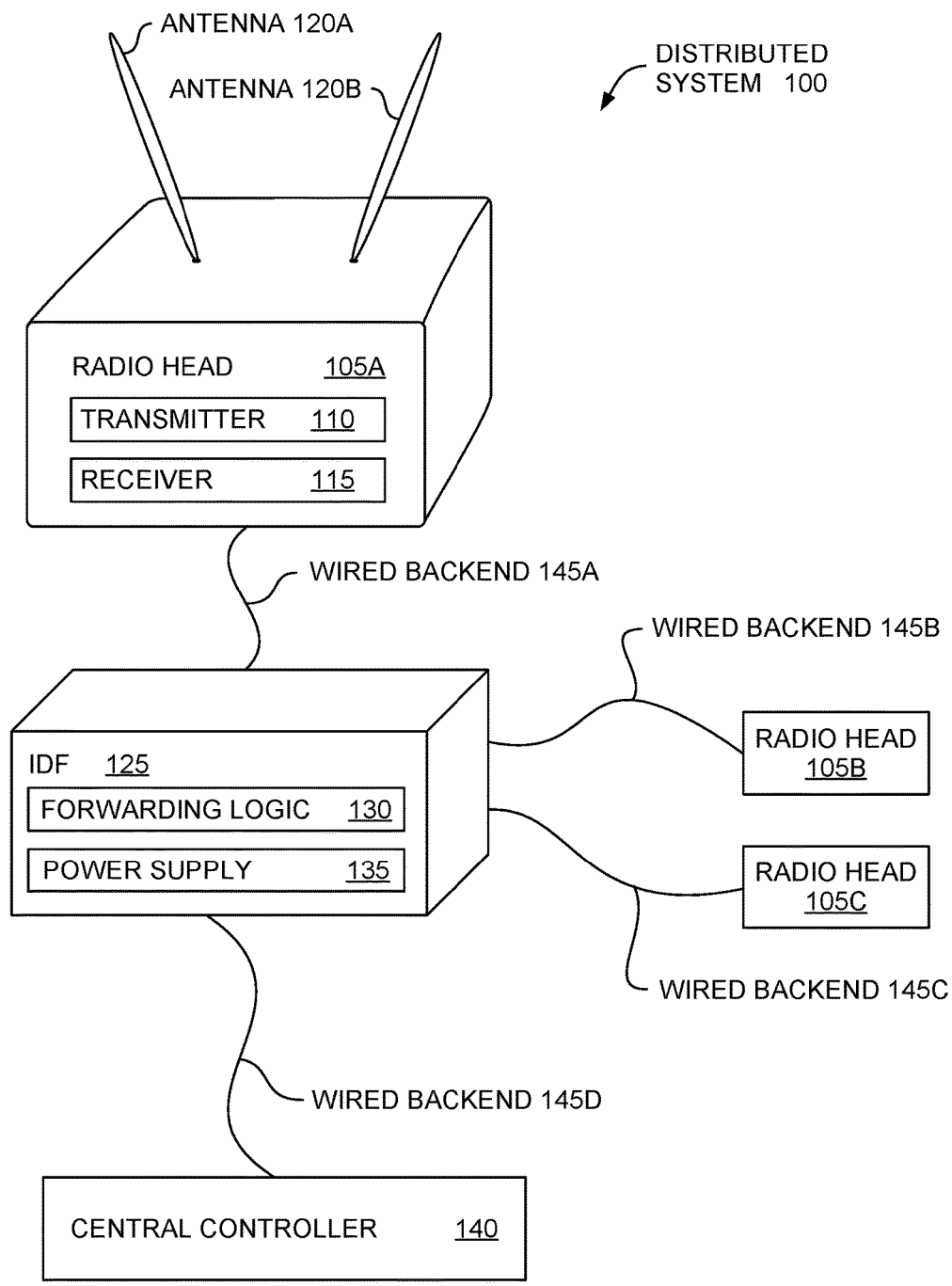
FIG. 1 illustrates a distributed system that includes an IDF, according to one embodiment described herein.

One embodiment presented in this disclosure is an IDF that includes forwarding logic configured to receive data from a central controller intended for a plurality of radio heads, recover a clock used to generate the received data, multiplex the received data into respective input/output (I/O) interfaces for the plurality of radio heads, and transmit the multiplexed data to the plurality of radio heads via the respective I/O interfaces along with the recovered clock. Moreover, plurality of radio heads each comprise an antenna for wirelessly transmitting the multiplexed data.

Another embodiment described herein is a distributed system that includes a central controller, an IDF coupled to the central controller via a first cable, and a plurality of radio heads coupled to the IDF via respective cables. The IDF is configured to receive data from the central controller intended for the plurality of radio heads, recover a clock used to generate the received data, multiplex the received data into respective input/output (I/O) interfaces for the plurality of radio heads, and transmit the multiplexed data to the plurality of radio heads via the respective I/O interfaces along with the recovered clock. Moreover, the plurality of radio heads each comprises an antenna for wirelessly transmitting the multiplexed data.

Another embodiment described herein is a method of operating an IDF. The method includes receiving data from a central controller intended for a plurality of radio heads, recovering a clock used to generate the received data, multiplexing the received data into respective input/output (I/O) interfaces for the plurality of radio heads, and transmitting the multiplexed data to the plurality of radio heads via the respective I/O interfaces along with the recovered clock. Moreover, the plurality of radio heads each comprises an antenna for wirelessly transmitting the multiplexed data.

Example Embodiments

The embodiments herein describe a distributed system (e.g., a distributed access point) that provides wireless access to a network for user devices. The distributed system includes a central controller that is coupled to a plurality of radio heads that each includes one or more antennas. Relative to typical standalone access points (APs) which include expensive network controllers and memory for processing and forwarding packets, the radio heads may have scaled down systems that forward received waveforms to the central controller which performs some or all of the modulation/demodulation and MAC layer processing and determines how to forward the packets. In this manner, the compute resources for processing packets received on a plurality of radio heads can be centralized at the central controller which reduces overall cost.

In some deployments of the distributed system, such as a large building (e.g., a sports venue) or multiple buildings (e.g., a college campus), the radio heads may be disposed large distances from the central controller. If the radio heads were connected directly to the central controller, the distributed system may need several hundred feet of cable to couple each of the radio heads to the controller, exceeding the maximum distance supported by twisted pair Ethernet. Instead, the embodiments herein describe using an IDF which is connected between the central controller and the radio heads. Instead of running separate cables to each of the radio heads, a single long cable can be used to connect the IDF to the central controller and then separate shorter cables can be used to connect the IDF to the radio heads. If the IDF is disposed near the radio heads, the amount of cables can be reduced.

To perform some multi-user functions such as multi-user multiple-input and multiple-output (MU-MIMO), the distributed system may require low latency and jitter between the central controller and the radio heads and precise clock synchronization. As such, forwarding logic in the IDF which forwards data signals between the controller and the radio heads may have low latency so that the overall latency and jitter of the distributed system does not exceed the 802.11 SIFS/SLOT timing or prevent performing MU-MIMO. Moreover, in one embodiment, the IDF, unlike a switch, receives and then forwards data within a certain time frame thereby reducing jitter. For example, for each data packet received from the central controller, the IDF forwards the packet to the appropriate radio head with a skip or s slip caused by long term drift. In one embodiment, the waveforms forwarded by the IDF are received with a jitter of +/−8 B with a zero mean (or 6.4 ns if 10 G Ethernet is used). However, if a switch was used (which is non-deterministic) instead of the IDF, different flow and priority controls may cause the time taken to forward a received packet to vary by one or two microseconds which may mean MU-MIMO cannot be performed using the radio heads.

FIG. 1 illustrates a distributed system 100 that includes an IDF 125, according to one embodiment described herein. The communication system 100 includes a central controller 140 coupled to multiple radio heads 105 (which can also be referred to as APs) via the IDF 125. As shown, the central controller 140 is coupled to the IDF 125 using a wired backend 145D (i.e., a cable), while the IDF 125 is in turn coupled to the plurality of radio heads 105 using wired backends 145A-145C. In one embodiment, the wired backends 145A-D are each a single cable. Thus, adding the IDF 125 to the distributed system 100 may improve cable management (since the system 100 does not have cables directly coupling the central controller 140 to each of the radio heads 105. For example, if the radio heads 105 were each located 100 meters from the central controller 140, 300 meters of cable is needed to couple the radio heads 105 directly to the central controller 140. However, assuming the IDF 125 is disposed 20 meter from each of the radio heads 105 and 100 meters from the central controller 140, only 160 meters are cable are needed to implement the distributed system 100 shown in FIG. 1.

In one embodiment, the wired backend 145D is an optical cable which can permit higher data speeds than using a copper cable (e.g., a twisted pair Ethernet cable). If a single cable is used to couple the central controller 140 to the IDF 125, the amount of data that can be transferred between the IDF 125 and the radio heads 105 is limited to the bandwidth of that cable. While optical cables can transmit 100 Gbps of data, a twisted pair Ethernet cable can transmit at most 25 Gbps using current technology. Thus, an optical cable may be preferred in the distributed system 100 to maximize the amount of data that can be transferred between the central controller 140 and radio heads 105 without having to add additional cables.

In one embodiment, the distance between the central controller 140 and the IDF 125 may be too long to use an Ethernet cable. For example, the latency or the signal to noise ratio associated with the Ethernet cable may mean the distributed system 100 uses an optical fiber as the wired backend 145D which generally has lower transmission latency than Ethernet cables.

The wired backends 145A-C coupling the IDF 125 to the radio heads 105 can be Ethernet or optical cables. One advantage of using Ethernet cables as the wired backends 145A-C is that a power supply 135 on the IDF 125 can be used to provide power-over-Ethernet (PoE) to the radio heads 105. In that case, the radio heads 105 can be located in areas that do not have power (e.g., AC power outlets) and instead rely on the power supply 135 in the IDF 125 to deliver power via the wired backends 145A-C. In this example, only the IDF 125 is coupled to an external power source which avoids having to run power cords to the radio heads 105 and can reduce costs. Alternatively, in one embodiment, if an Ethernet cable is used as the wired backend 145D, the central controller 140 can include a power supply that provides power to the IDF 125 using PoE. In that example, the IDF 125 does not need to rely on a power outlet for power. The radio heads 135 could be coupled to a separate power supply or receive PoE via the IDF 125 (assuming the combination of the radio heads 135 and IDF 125 do not exceed the maximum power that can be supplied from PoE).

Using optical cables to couple the IDF 125 to the radio heads 105 may increase the data rate that can be transmitted between the devices relative to an Ethernet cable as discussed above. However, disposing optical transmitters and receivers in the radio heads 105 and the IDF 125 may be more expensive than PHYs for coupling to Ethernet cables.

The radio heads 105 include respective antennas 120 which facilitate wireless communication with other network systems or user devices. In one embodiment, the distributed system 100 may be an enterprise level deployment where the central controller 150 is disposed in a central location in a building or campus and the wired backends 145 (optical or electrical cables) couple the central controller 150 to the IDF 125 and the radio heads 105 which are spatially distributed in the building to provide wireless access to users in the building.

The radio head 105A includes two antennas 120A and 120B, a transmitter 110, and a receiver 115. Although only two antennas 120 are shown, the radio head 105A may include any number of antennas for serving any number of different radios. For example, the radio head 105A may include a first set of antennas with a first polarization connected to a first radio and a second set of antennas with a second, different polarization connected to a second radio. Using different polarized antennas may reduce interference when the first radio transmits data in the radio head 105A and the second radio receives data, and vice versa.

In one embodiment, the transmitter 110 and receiver 115 are part of a same radio—e.g., a transceiver. To perform MIMO, the transmitter 110 and receiver 115 use respective transmit and receive filters for reducing interference from other data signals transmitted on other subcarriers. MU-MIMO is a wireless MIMO technique where at least one radio head 105 sends different data to multiple user devices at the same time. In one embodiment, the central controller 140 calculates the filters for each of the radio heads 105 for performing MIMO. For example, the more compute intensive tasks associated with routing data packets may be performed by the central controller 150 which may have a larger amount of compute capacity than the radio heads 105. Put differently, the radio heads 105 can be designed to have less compute capacity thereby reducing their cost relative to a standalone AP.

In one embodiment, the central controller 140 includes hardware components such as one or more network processors and memory. Further, the central controller 140 may host an operating system that executes one or more software applications. In one embodiment, the radio heads 105 may include a PHY layer that receives and transmits wireless signals (i.e., an analog interface) while the central controller 140 includes a digital portion of a PHY layer and a MAC layer for processing received packets and transmitting packets to the radio heads 105. Thus, the PHY layer may be split between the radio heads 105 and the central controller 140 where the higher level processing layers are in the central controller 140. In one embodiment, the radio heads 105 also include high-level processing layers (e.g., MAC or physical coding sublayer (PCS)) to evaluate the received packets. For example, the radio heads 105 may include higher-level processing levels to determine if there is interference on a channel when performing clear channel assessment.

In one embodiment, the radio heads 105, the IDF 125 and the central controller 140 are perceived to the perspective of a user device as a single device—e.g., a single AP. For example, the user device can communicate through any of the radio heads 105, and to its perspective, is communicating with the same AP. Thus, in this embodiment, the BSSID transmitted through each of the radio heads 105 is the same. Alternatively, in another embodiment, the central controller 140 may assign different groups of the radio heads 105 to different BSSIDs. In this case, to the perspective of an associated user device, the user device believes it is communicating with different APs depending on the BSSID of the radio head the user device is communicating with. In this example, the system 100 appears as multiple APs although all the radio heads 105 may be controlled by a single central controller 140.

Figure 2:
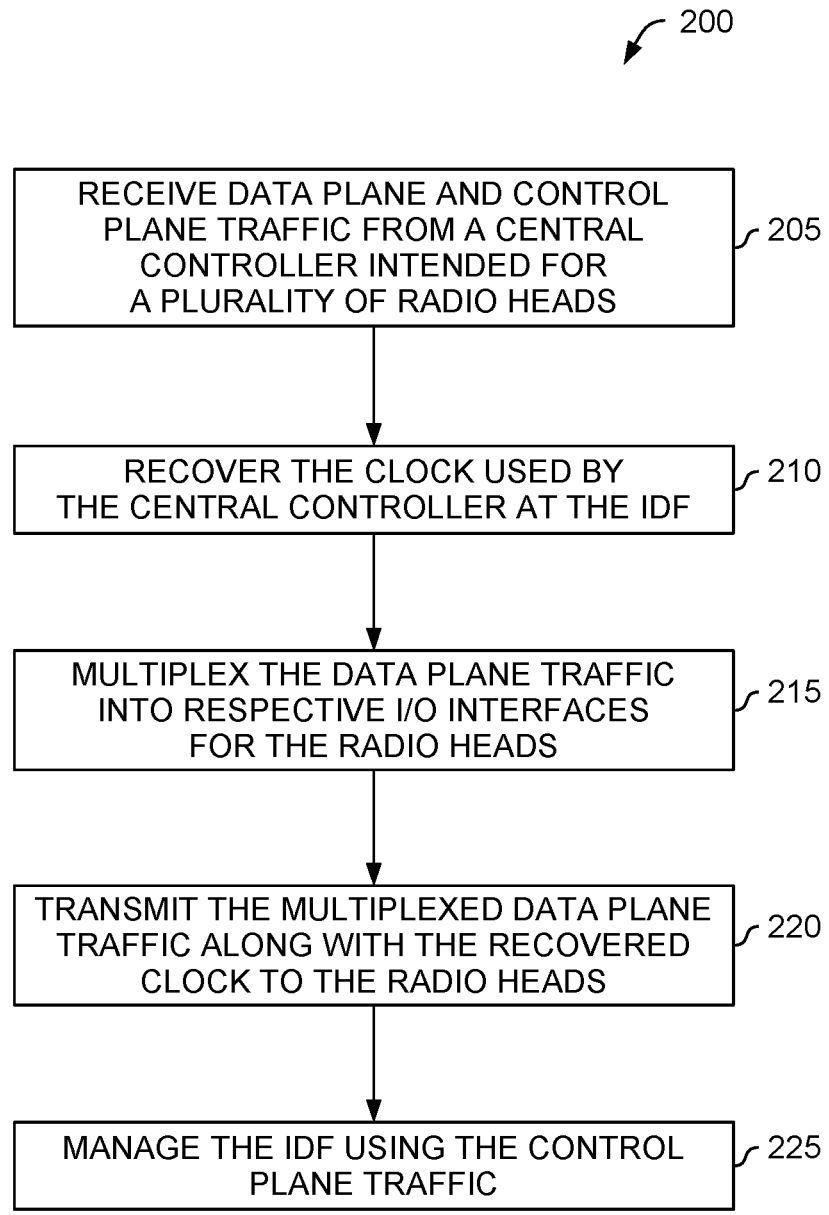
FIG. 2 is a flowchart for forwarding data between a central controller and radio heads in a distributed system, according to one embodiment described herein.

FIG. 2 is a flowchart for forwarding data between a central controller and radio heads in a distributed system, according to one embodiment described herein. At block 205, the IDF receives data plane and control plane traffic from a central controller intended for a plurality of radio heads. As described above, the IDF is an intermediate device that receives data signals (e.g., IQ signals) which are forwarded to the radio heads. Moreover, in the embodiments below it is assumed that the central controller also transmits control plane traffic intended for the IDF for managing the functions of the IDF (which is described later). For example, the central controller may transmit 100 Gbps of data to the IDF (using an optical cable) where the majority of the data is intended for the radio heads but a portion of that data contains control plane traffic for managing the IDF which is not forwarded to the radio heads.

The IDF includes a PHY layer for receiving the data signals received from the central controller. Moreover, the IDF includes forwarding logic for determining which data is intended for the radio heads and which portions are intended for the IDF (i.e., the control plane traffic). Of course, in some embodiments, the central controller may also forward control plane traffic to the radio heads. In which case, the IDF forwards this traffic to the radio heads as described below.

At block 210, the IDF recovers the clock used by the central controller. For example, the forwarding logic in the IDF uses the signals received from the central controller to recover the clock used by the central controller to transmit the data to the IDF. The IDF can use the recovered clock to control its forwarding logic that forwards the received data signals to the respective radio heads. In this manner, the IDF has a master-servant relationship with the radio heads where the clock provided by the IDF (which can be recovered from the signals received from the central controller) synchronizes the radio heads to the central controller. Put differently, the downlinks to the radio heads are servants to the clock signal for the uplink coupling the IDF to the central controller.

At block 215, the IDF multiplexes the data plane traffic into respective I/O interfaces for the radio heads. In one embodiment, the central controller interleaves the data plane traffic for the radio heads when transmitting the data to the IDF. As such, the IDF demultiplexes the received data plane traffic so that the data intended for a particular radio head is forwarded to the corresponding I/O interface. In this manner, the IDF can receive a single stream of data using a single high speed link (e.g., a 100 Gbps optical link) and demultiplex the data into different streams for the respective radio heads (e.g., a 10 Gbps stream to each radio head) without packetization latencies.

In one embodiment, the IDF uses Synchronization Ethernet (SyncE) to synchronize the radio heads to the central controller. As described above, the distributed system may need very low jitter (e.g., +/−1 ps) when signals are received at the radio heads to perform certain MIMO functions. By recovering the clock at the IDF and then using that clock to forward the data to the radio heads, the IDF can use SyncE to synchronize the radio heads to the central controller. Generally, SyncE is a standard where the frequency of the transmitted signals is adjusted to synchronize two ends of a communication link (e.g., the central controller and the radio heads) using the master clock (e.g., the clock recovered from the central controller. The details of recovering the clock are described later in FIG. 7.

Figure 3:
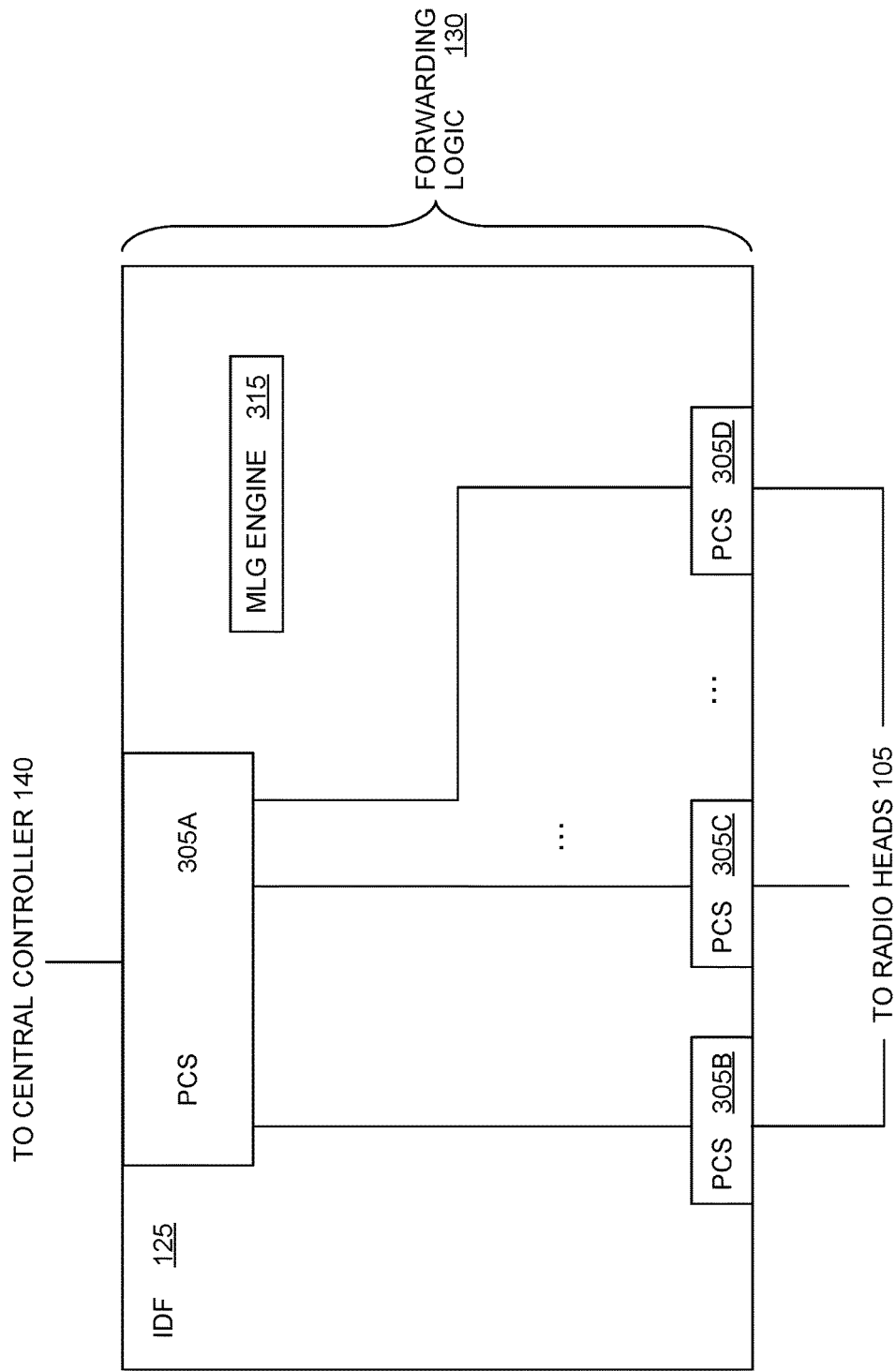
FIG. 3 illustrates forwarding logic in the IDF, according to one embodiment described herein.

FIG. 3 illustrates forwarding logic 130 in the IDF, according to one embodiment described herein. As shown, FIG. 3 illustrates portions of the forwarding logic 130 for forwarding data received from the central controller 140 to the radio heads 105. In this embodiment, the forwarding logic 130 includes a PCS layer 305 that forms an I/O interface for coupling the IDF 125 to the central controller 140 and the radio heads 105. Although a PCS layer 305 is shown, in other embodiments, the I/O interfaces may include additional components for performing the functions herein.

The waveforms transmitted by the central controller 140 are received at the PCS layer 305 at the top of the PHY layer. In some embodiments, the PCS layer 305 can perform encoding/decoding, scrambling/descrambling, alignment marker insertion/removal, block and symbol redistribution, and lane block synchronization and deskewing. In this example, the PCS layer 305 includes a multiplexer for forwarding the received data to a plurality of PCS layers—i.e., PCS layers 305B-305D. The PCS layer 305A demultiplexes the data stream received by the central controller 140 into the PCS layer corresponding to the intended recipient. For example, if the data from the central controller 140 includes 50 Gbps for five radio heads, the PCS layer 305A multiplexes the received data into five separate 10 Gbps streams into the corresponding PCS layers 305.

The respective PCS layers 305B-D for the I/O interfaces for the radio heads transmit the waveforms received from the central controller 140 to the radio heads. The PCS layers 305B-D may be coupled to either optical or Ethernet (e.g., copper) cables for communicating with the radio heads 105. Although not shown in FIG. 3, if Ethernet cables are used, the IDF 125 may transmit PoE to the radio heads 105 which enables the radio heads to be located in remote locations without easy access to power.

The forwarding logic 130 also includes a multi-link gearbox (MLG) engine 315. As described in more detail below, the serializers/deserializers (SerDes) in the central controller may use a cut through model as described in USXGMII to create the data stream transmitted to the IDF 125. Doing so permits the SerDes to create a single data stream that contains interleaved data for multiple destinations—e.g., different radio heads. The MLG engine 315 is in communication with a corresponding engine in the central controller to determine the particular MLG mapping used by the central controller to generate the data stream. For example, the MLG engine 315 determines whether the central controller transmits a data stream containing 10 Gbps of data for five radio heads or 5 Gbps of data for ten radio heads. Once the MLG mapping is known, the MLG engine 315 controls the multiplexing performed by the PCS layer 305A to ensure the appropriate data is forwarded to the radio heads. For example, the IDF 125 may include appropriate hardware (e.g., PCS layers in a PHY) for up to eight radio heads 105. If the IDF 125 is coupled to eight radio heads 105, the central controller may transmit interleaved data containing 10 Gbps for each radio heads (e.g., 80 Gbps). In response, the MLG engine 315 controls the PCS layer 305A such that the appropriate 10 Gbps is forwarded to each of the eight PCS layers 305 in the I/O interface for the central controller 140 in the IDF 125. However, if only four radio heads 105 are currently coupled to the IDF 125, the central controller may transmit fill (null) data (or increase the data transmitted to the individual radio heads) so that data stream is still 80 Gbps. As described below, the MLG engine 315 can adjust the multiplexing the PCS layer 305 such that the data streams for the four connected radio heads 105 is forwarded to the appropriate PCS layers 305 while the remaining data is discarded.

Returning to method 200, at block 220, the IDF transmits the multiplexed data plane traffic along with the recovered clock to the radio heads. As described above, in one embodiment, the uplinks between the IDF to the radio heads are servants to the downlink between the central controller and the IDF. Moreover, the IDF may be a deterministic device where the data received by the IDF is consistently transmitted to the radio heads with the same latency. That is, the traversal time for the received packets through the IDF 125 is substantially the same (with some minor variation in jitter: +/−1 ns). Thus, unlike traditional switches, the IDF can predictively receive and forward the packets between the central controller and the radio heads.

Although the previous discussion described forwarding IQ signals received from the central controller to the radio heads, the IDF also receives IQ data signals from the radio head and transmits this data to the central controller. Referring again to FIG. 3, the radio heads may receive wireless signals from user devices and use respective PHY layers (not shown) to transmit waveforms to the PCS layers B-D in the IDF 125. These waveforms are interleaved in the PCS layer 305A before being transmitted to the central controller 140. That is, the MLG engine 315 provides an MLG mapping to the PCS layer 305 so the respective data streams received from the radio heads 105 (e.g., 3×10 Gbps) can be interleaved into a single data stream that is transmitted to the central controller (e.g., 30 Gbps). Because this MLG mapping may be previously negotiated with the MLG engine in the central controller—i.e., the central controller knows the MLG mapping used by the IDF 125—the central controller can separate (i.e., demultiplex) the single data stream and individually process the data received from the radio heads. In this manner, the IDF 125 permits bi-directional communication between the central controller 140 and the radio heads 105 without adding latency and jitter that would prevent the distributed system from performing MIMO functions.

At block 225, IDF uses the control plane traffic to manage its settings. As described above, the data stream between the central controller and the IDF can contain control plane traffic for managing the IDF. For example, a 100 Gbps data stream generated by the central controller may contain 1 Gbps of control plane traffic for the IDF. Because the MLG engine on the IDF knows where this control plane traffic is located in the received data stream, the IDF can separate this data from the remaining data in the data stream that is for the radio head or has fill data.

The IDF can contain a processor for adjusting the functions of the IDF in response to the control plane traffic. For example, the central controller may use the control plane traffic to detect and initialize the IDF and control downstream PoE from the IDF to the radio heads. Although not shown in FIG. 3, the IDF 125 may include a MAC layer coupled to the PCS 305A for receiving control plane data from the central controller 140. This control plane data may include the MLG mapping described above. In other examples, the control plane traffic can be used to upload software or firmware updates for the IDF. For instance, the control plane traffic can provide updates for fixing a bug identified in the IDF after the IDF was manufactured or deployed. Moreover, the control plane traffic can enable and disable ports in the IDF and manage power distribution between ports if PoE is used. Thus, in this manner, a portion of the data stream between the IDF and the central controller can be used to establish bi-directional communication between these devices. In one embodiment, the IDF does not forward this data to the radio heads. For example, the IDF may receive 51 Gbps of data from the central controller (e.g., 5×10 Gbps for the radio heads and 1 Gbps for the control plane traffic of the IDF) but the IDF forwards only the 50 Gbps of data intended for the radio heads and processes the control plane traffic internally.

Figure 4:
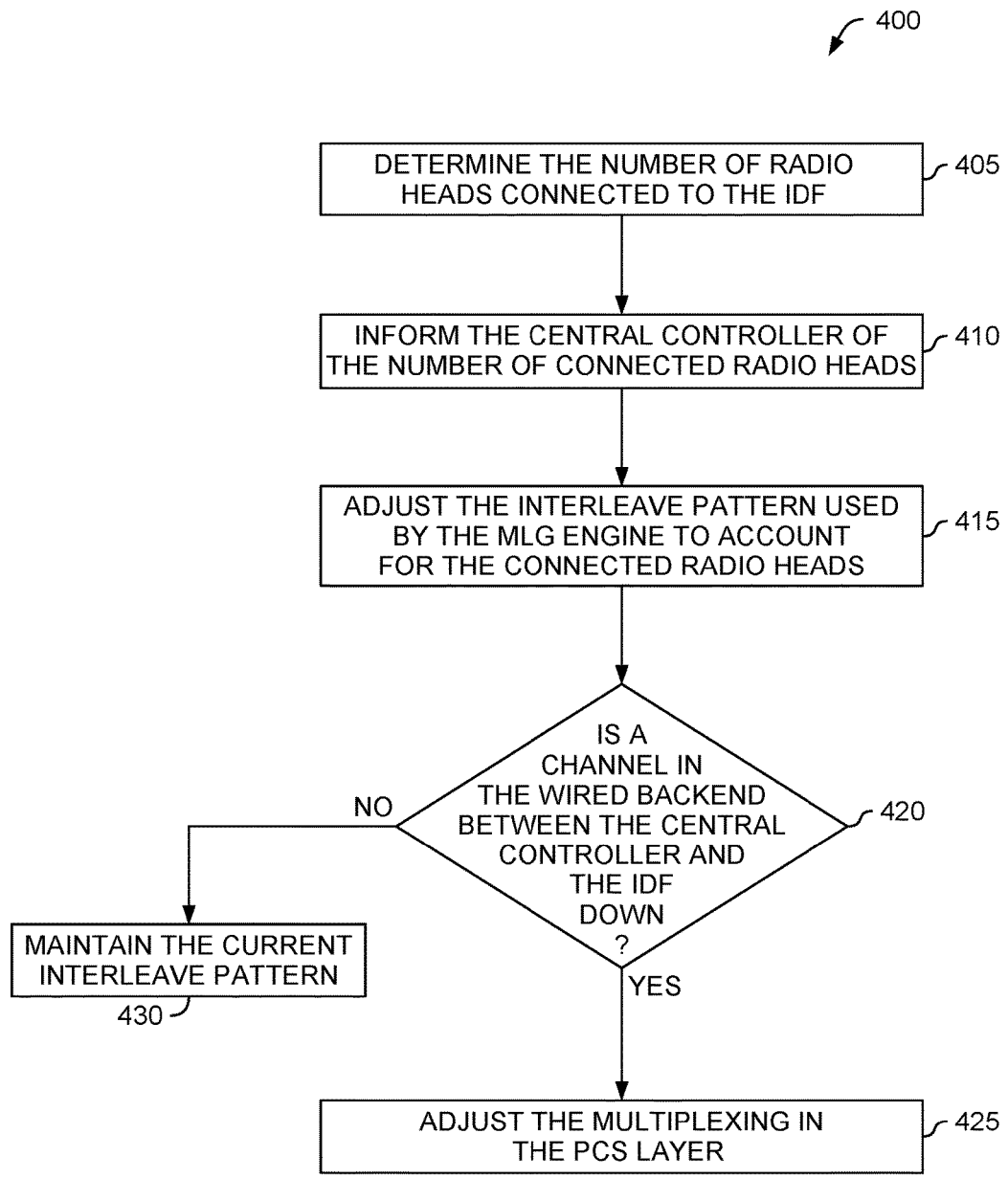
FIG. 4 is a flowchart for adjusting the interleave pattern used by a multi-link gearbox engine, according to one embodiment described herein.

FIG. 4 is a flowchart of a method 400 for adjusting the interleave pattern used by a MLG engine, according to one embodiment described herein. At block 405, the IDF determines the number of connected radio heads. For example, the IDF may include eight I/O interfaces including Ethernet or optical ports for coupling to radio heads, however, only a portion of the I/O interfaces may currently be connected to a radio head.

At block 410, the IDF informs the central controller of the number of connected radio heads. In one embodiment, the IDF uses the control plane data stream discussed above to inform the central controller of the number of connected radio heads.

In one embodiment, the central controller transmits the same amount of data to the IDF (and vice versus) regardless of the number of radio heads connected to the IDF. For example, the central controller and IDF may transmit 100 Gbps of data regardless of whether there is two or eight radio heads coupled to the IDF. In one embodiment, the central controller includes eight SerDes lanes that each can support 10 G. If the central controller is coupled directly to either radio heads, then each of the eight SerDes lanes provides eight individual 10 Gbps links to the radio heads. However, when the central controller is coupled to the IDF as shown in FIG. 1, a portion of the SerDes lanes are reconfigured to work together to transmit and receive data to the IDF. In one embodiment, the four SerDes lanes to form a single 100 GBASE-SR4 optical link to the IDF. In this example, the four SerDes lanes provide a 4×25 G 100 GBASE-SR4 link with a variant of MLG to multiplex multiple logical ports over a set of the four SerDes lanes. In order to support low cost 10 G optical radio heads, the SerDes are rated at 25 Gbps for better signal integrity, but still are clocked at 10 G.

In one embodiment, the other remaining SerDes lanes in the network controller (e.g., four of the eight) are unused or disabled when the central controller is coupled to the IDF. However, in other embodiments, the unused SerDes lanes may be used to communicate with radio heads that are directly coupled to the central controller. For example, another four radio heads could be coupled to the central controller and use the other four SerDes lanes to form respective 10 Gbps links to these radio heads. However, the central controller may need to contain more routing logic and firmware to establish the 100 Gbps link to the IDF along with the 4×10 Gbps to the directly coupled radio heads when compared to a central controller that is configured to either provide up to 8×10 Gbps links to eight directly connect radio heads or 1×100 Gbps to a IDF, but not both simultaneously.

As mentioned above, the central controller may establish a 100 Gbps link to the IDF regardless of the number of radio heads connected to the IDF. For example, if there are four connected radio heads, the central controller may transmit 100 Gbps of data to the IDF even though only 4×10 Gbps of that data is actually intended for the radio heads. The remaining portion of the data may be fill data (i.e., unused data). One reason for doing so is that the central controller can use USXGMII-M which provides a cut-through model for transmitting data rather than a store and forward model. Moreover, sending packets with gaps causes jitter. The four SerDes generating the 100 Gbps link can execute at the same rate regardless of the number of radio heads connected to the IDF. The PCS layer in the central controller can perform data replication using a cut through model so that the data does not need to be stored, or change the rate of the SerDes. The MLG engine in the central controller can establish an interleave pattern used by the PCS layer to generate the 100 Gbps link. This interleave pattern can vary depending on the number of radio heads connected to the IDF.

At block 415, the interleave pattern used by the MLG engines in the central controller and the IDF is adjusted to account for the connected radio heads. For example, after transmitting initial synchronization patterns over the four SerDes lanes to identify order and phase offset between lanes, the MLG engine in the central controller can instruct the PCS layer to interleave PCS words for up to 10×10 Gbps ports in the interleave pattern using the 4×25 Gbps provided by the four SerDes lanes. Doing so interleaves both the Ethernet frames as well as interframe gaps (IFG) and preambles in a cut through manner and can add or drop one PCS idle in the IFG to match minor timing differences between interfaces—e.g., ingress and egress Ethernet ports. As the number of connected radio heads changes, so will the amount of fill or idle data transmitted in the 100 Gbps link. That is, instead of changing the rate of the SerDes to use a non-standard data rate, the MLG engine provides fill patterns such as local fault for the unused ports to account for the number of connected radio heads. For instance, if a radio head is disconnected from the IDF, the MLG engine instructs the PCS layer to use local fault pattern or some other fill pattern to insert fill or idle data into the 10 Gbps in the 100 Gbps link that was previously used to transmit data between the central controller and the now disconnected radio head.

FIG. 5 is a MLG mapping 500, according to one embodiment. In this mapping 500, it is assumed that link between the IDF and the central controller is 100 Gbps which is subdivided into 10×10 Gbps links. At this time, Links 1-6 are assigned to transmit data plane traffic for radio heads (RHs) 105A-105F. Put differently, in this example, there are six radio heads 105 coupled to the IDF which are each assigned 10 Gbps of the 100 Gbps link. In this embodiment, the Links 7-9 (and the corresponding 3×10 Gbps) include fill data. That is, the MLG engines in the central controller and IDF instruct their respective PCS layers to use a fill pattern to insert 30 Gbps of fill data so that the total data rate of 100 Gbps is maintained.

In another embodiment, the bandwidth is not distributed equally among the radio heads. For example, a 100 G link can be multiplexed across twelve radio heads where eight of the radio heads have 10 G links and four of the radio heads have 5 G links.

Moreover, Link 10 includes control plane traffic for the IDF. As mentioned above, this traffic can be used to obtain a status of the IDF, provide firmware/software updates, and the like. However, the full 10 Gbps of data may be more than is needed to transmit the desired control plane traffic. In this embodiment, the IDF can use USXGMII to convert the received 10 Gbps from the central controller to 1 Gbps which again avoids changing the speed or rate of the SerDes in the central controller.

Using the mapping 500 in FIG. 5, the MLG engines can transmit 100 Gbps although only 61 Gbps is actually used for either data plane or control plane traffic for the radio heads and the IDF.

Returning to block 420, the central controller or a system administrator determines if a channel in the wired backend to the central controller is down. For example, one of the four SerDes lanes providing the 100 Gbps link may be down. In one embodiment, the bit error rate (BER) for one of the SerDes lanes may exceed a threshold. For example, a system administrator may test each of the SerDes lanes after detecting a performance issue with the central controller to determine the BER for each of the lanes. If the administrator determines a lane is down or unavailable, the MLG engine can adjust its mapping to account for the reduction in usable bandwidth.

FIG. 6 is a MLG mapping 600, according to one embodiment. Here, it is assumed that one of the 25 Gbps SerDes lanes is unavailable, thereby leaving 75 Gbps of usable bandwidth in the link between the central controller and the IDF. Moreover, there are eight radio heads connected to the IDF rather than only six as shown in mapping 500 in FIG. 5. If all four SerDes lanes were available, then each of Links 1-8 would have at least 10 Gbps available. However, since only 3×25 Gbps is available to transmit usable data, the MLG engines reduce the bandwidth provided to Links 1 and 2 to 5 Gbps which transmit data plane traffic to radio heads 105A and 105B. The Links 3-8 to radio heads 105C-H can be maintained at 10 Gbps. Moreover, the bandwidth of Link 9 (which transmitted idle data in mapping 500) is not assigned any bandwidth. Further, the bandwidth of Link 10 is reduced to 5 Gbps relative to mapping 500. Because this data is down converted to 1 Gbps, the same amount of information can be provided to the control plane in the IDF as before one of the SerDes lane was unavailable.

In mapping 600, the total assigned bandwidth is 75 Gbps which means the three functional SerDes lanes can run at the 25 Gbps rate (i.e., the speeds do not need to be changed) and thus, the cut through model can be employed. Data replication in the PCS layers can increase the data rate from 75 Gbps to 100 Gbps so that the 100 GBASE optical standard can be used. In this manner, the MLG engines can adjust the MLG mappings depending on the number of connected radio heads as well as the number of functional SerDes lanes (i.e., channels) which has a corresponding effect on the interleaving performed in the PCS layers in the central controller and the IDF.

Returning to method 400, at block 425, the MLG engine adjusts the multiplexing in the PCS layer based on the MLG mapping 600 in FIG. 6. For example, because the bandwidths for Links 1 and 2 were reduced to 5 Gbps, the PCS layer transmits 5 Gbps of data to the PCS layers corresponding to radio heads 105A and 105B but transmits 10 Gbps of data to the PCS layers corresponding to radio heads 105C-H. In this manner, the MLG engine can adjust the bandwidth assigned to the various links in the MLG mapping and still maintain a 100 Gbps total transmission by using data replication in the PCS layer.

However, if at block 420, the channels in the wired backend are operating normally, method 400 proceeds to block 430 where the same interleave pattern is maintained. That is, the MLG engines in the IDF and central controller use the same MLG mapping in order to interleave the data transmitted on the wired backend coupling these devices.

Figure 7:
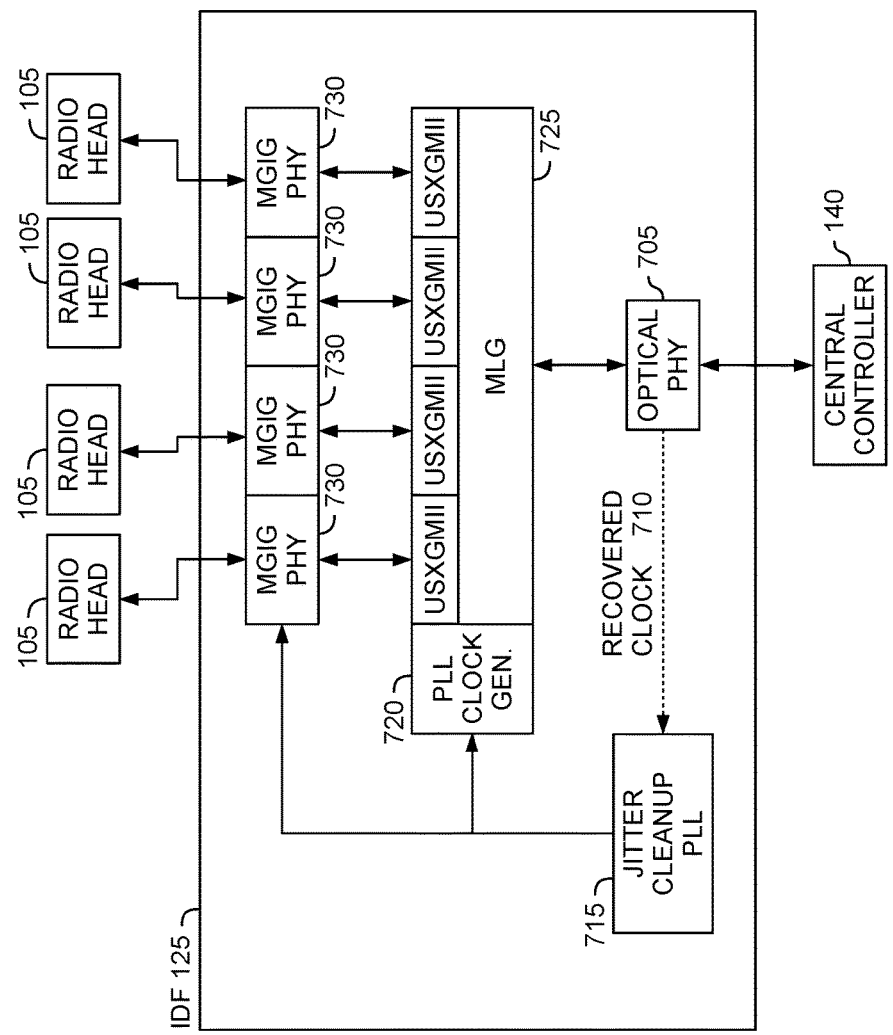
FIG. 7 illustrates a system used to recover a clock in the IDF 125, according to one embodiment described herein.

FIG. 7 illustrates a system used to recover a clock in the IDF 125, according to one embodiment described herein. As shown, the IDF 125 includes an optical PHY 705 which recovers the data-clock provided by the central controller 140 when a link is established between the optical PHY 705 and the central controller 140. This recovered clock 710 is used as a reference signal in a jitter cleanup phase locked-loop (PLL) 715 in the IDF 125. In one embodiment, the jitter clean up PLL 715 is a narrow bandwidth phase and frequency locked loop. The jitter clean up PLL 715 provides clock references in the data-path in the IDF. In this example, the PLL 715 provides clock references to a PLL clock generator 720 and the respective mGig PHYs 730 for the radio heads 105. The PLL clock generator 720 (along with a MLG module 725) can use the clock reference provided by the jitter cleanup PLL 715 to send and receive data at respective USXGMII interfaces which are in turn coupled to the respective PHYs 730. In one embodiment, the PHYs 730 are part of the PCS layers 305 illustrated in FIG. 3.

Because the clock reference outputted by the Jitter Cleanup PLL 715 is used as the mGig data-clock reference for the PHYs 730, the radio-heads 105 can recover a clock which is phase and frequency locked to the clock outputted by the central controller 140. In this manner, the IDF 125 recovers a clock from the central controller 140 which can be used to synchronize the radio heads 105 to the central controller 140.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An intermediate distribution frame (IDF), comprising:
   forwarding logic configured to:
      receive data from a central controller intended for a plurality of radio heads;
      recover a clock used to generate the received data;
      multiplex the received data into respective input/output (I/O) interfaces for the plurality of radio heads; and
      transmit the multiplexed data to the plurality of radio heads via the respective I/O interfaces along with the recovered clock, wherein the plurality of radio heads each comprises an antenna for wirelessly transmitting the multiplexed data.

2. The IDF of claim 1, wherein the recovered clock synchronizes the plurality of radio heads to the central controller.

3. The IDF of claim 1, wherein the received data comprises interleaved data plane traffic for the radio heads, wherein an I/O interface in the forwarding logic includes a physical coding sublayer (PCS) that multiplexes the interleaved data plane traffic into respective PCS layers corresponding to the plurality of radio heads.

4. The IDF of claim 3, wherein the respective PCS layers are configured to forward the multiplexed data to the plurality of radio heads.

5. The IDF of claim 1, further comprising:
   a power supply configured to provide power over Ethernet (PoE) to the plurality of radio heads.

6. The IDF of claim 5, wherein the respective I/O interfaces are configured to connect to twisted pair Ethernet cables to communicate with the plurality of radio heads, wherein the forwarding logic comprises an I/O interface corresponding to the central controller, wherein the I/O interface is configured to connect to an optical cable to communicate with the central controller.

7. The IDF of claim 1, wherein the forwarding logic is configured to:
   receive control plane traffic from the central controller for managing the IDF, wherein the control plane traffic is received in a same data stream as the received data intended for the plurality of radio heads.

8. The IDF of claim 1, further comprising:
   a multi-link gearbox (MLG) engine configured to establish a pattern used when multiplexing the received data to the plurality of radio heads, wherein the MLG engine is configured to change the pattern as at least one of the number of radio heads coupled to the IDF varies and link speed to the plurality of radio heads changes.

9. A distributed system, comprising:
   a central controller;
   an IDF coupled to the central controller via a first cable; and
   a plurality of radio heads coupled to the IDF via respective cables,
   wherein the IDF is configured to:
      receive data from the central controller intended for the plurality of radio heads;
      recover a clock used to generate the received data;
      multiplex the received data into respective input/output (I/O) interfaces for the plurality of radio heads; and
      transmit the multiplexed data to the plurality of radio heads via the respective I/O interfaces along with the recovered clock, wherein the plurality of
   radio heads each comprises an antenna for wirelessly transmitting the multiplexed data.

10. The distributed system of claim 9, wherein the recovered clock synchronizes the plurality of radio heads to the central controller.

11. The distributed system of claim 9, wherein the received data comprises interleaved data plane traffic for the plurality of radio heads, wherein an I/O interface in the IDF includes a physical coding sublayer (PCS) that multiplexes the interleaved data plane traffic into respective PCS layers corresponding to the plurality of radio heads.

12. The distributed system of claim 9, wherein the first cable is an optical cable and wherein the respective cables are respective Ethernet cables.

13. The distributed system of claim 9, wherein the central controller is configured to transmit control plane traffic for managing the IDF, wherein the control plane traffic is received in a same data stream as the received data intended for the plurality of radio heads.

14. The distributed system of claim 9, wherein the central controller is configured to assign the plurality of radio heads to a common BSSID so that the plurality of radio heads appear to a perspective of a user device in wireless communication with at least one of the plurality of radio heads as a single access point.

15. A method of operating an IDF, comprising:
  receiving data from a central controller intended for a plurality of radio heads;
  recovering a clock used to generate the received data;
  multiplexing the received data into respective input/output (I/O) interfaces for the plurality of radio heads; and
  transmitting the multiplexed data to the plurality of radio heads via the respective I/O interfaces along with the recovered clock, wherein the plurality of radio heads each comprises an antenna for wirelessly transmitting the multiplexed data.

16. The method of claim 15, wherein the recovered clock synchronizes the plurality of radio heads to the central controller.

17. The method of claim 15, wherein the received data comprises interleaved data plane traffic for the plurality of radio heads, wherein a first I/O interface in the IDF includes a physical coding sublayer (PCS) that multiplexes the interleaved data plane traffic into respective PCS layers corresponding to the plurality of radio heads.

18. The method of claim 15, further comprising:
  providing PoE to the plurality of radio heads via respective Ethernet cables coupled to the IDF and the plurality of radio heads.

19. The method of claim 15, wherein the I/O interfaces are configured to connect to Ethernet cables to communicate with the plurality of radio heads, wherein the IDF comprises an I/O interface corresponding to the central controller, wherein the I/O interface is configured to connect to an optical cable to communicate with the central controller.

20. The method of claim 15, comprising:
  receiving control plane traffic from the central controller for managing the IDF, wherein the control plane traffic is received in a same data stream as the received data intended for the plurality of radio heads.

* * * * *